United States Patent [19]

Pantland et al.

[11] Patent Number: 5,074,804

[45] Date of Patent: Dec. 24, 1991

[54] ELECTRICAL CONNECTORS

[75] Inventors: Robert M. Pantland, Longlevens; Neil Gow, Stroud, both of United Kingdom

[73] Assignee: Krone AG, Berlin, Fed. Rep. of Germany

[21] Appl. No.: 666,690

[22] Filed: Mar. 8, 1991

[30] Foreign Application Priority Data

Mar. 9, 1990 [GB] United Kingdom ............... 9005283

[51] Int. Cl.⁵ ............................................. H01R 4/24
[52] U.S. Cl. ................................................. 439/395
[58] Field of Search ........................... 439/389–425

[56] References Cited

U.S. PATENT DOCUMENTS

| | | | |
|---|---|---|---|
| 4,225,207 | 9/1980 | Brandeau et al. | 439/395 |
| 4,281,886 | 8/1981 | Kaplan | 439/395 |
| 4,948,380 | 8/1990 | Dale | 439/395 |

Primary Examiner—Joseph H. McGlynn
Attorney, Agent, or Firm—McGlew & Tuttle

[57] ABSTRACT

This invention relates to a connection device for providing a connection between on electrical cable terminated by a plug and electrically insulated wires. It has application, for example, in telecommunications where a telephone instrument is connected by a lead with an appropriate plug to a jack provided in a wall panel. The jack requires connection to telephone wires on the opposite side of the wall panel.

18 Claims, 11 Drawing Sheets

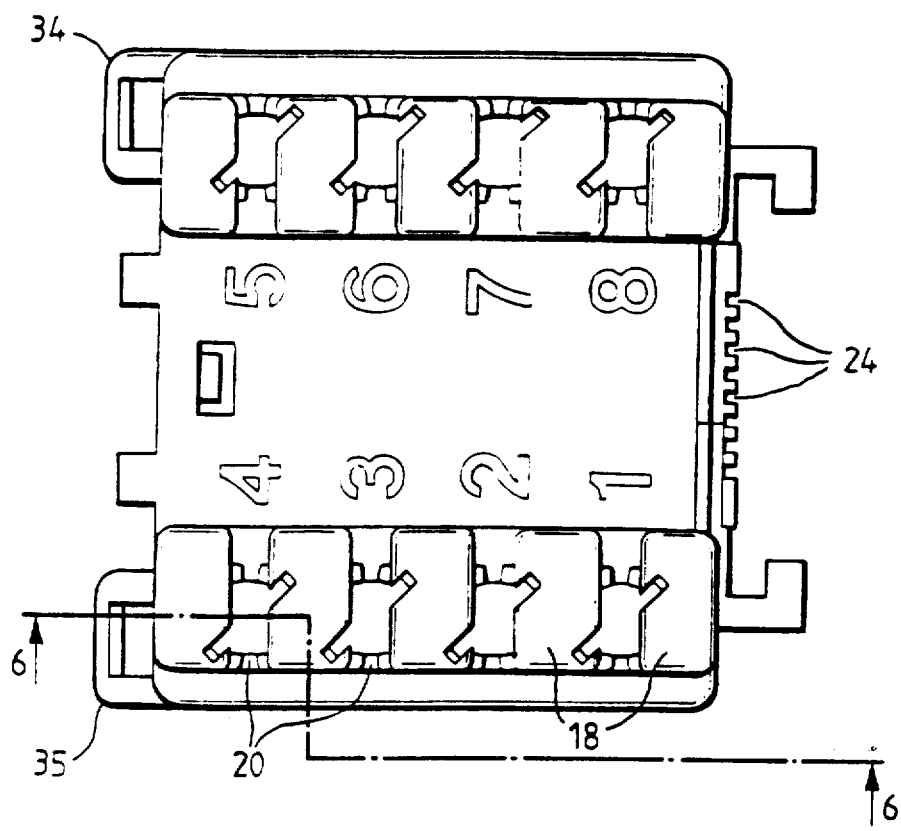
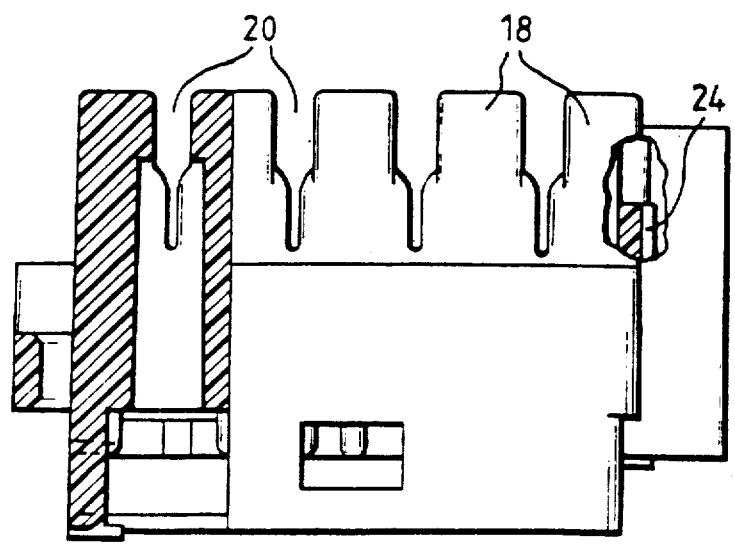

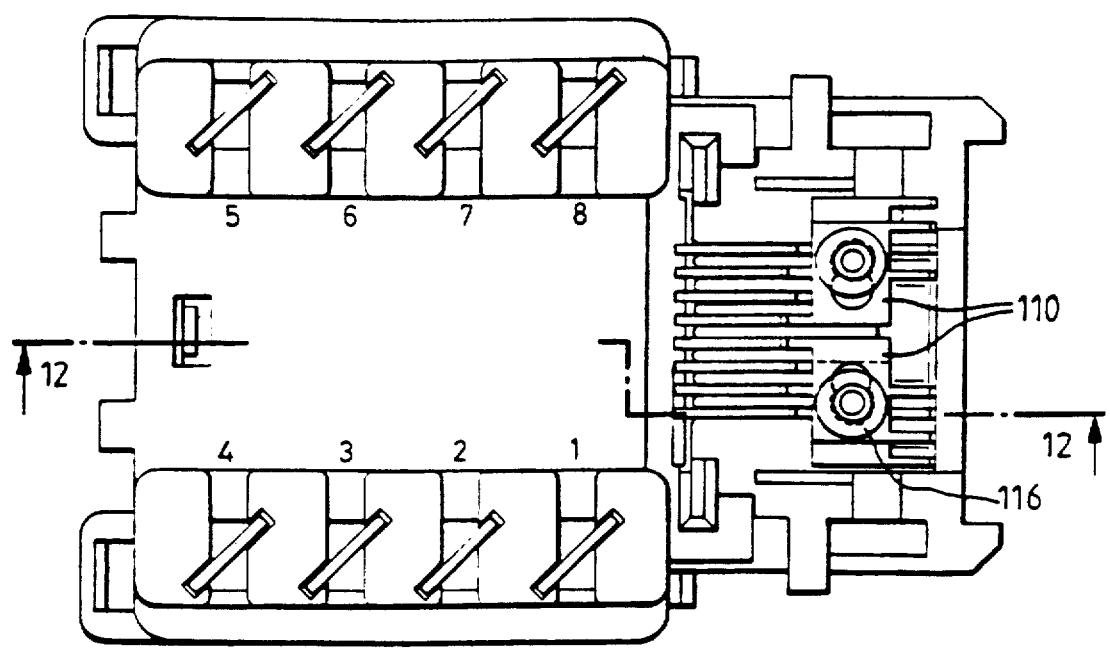
FIG.11
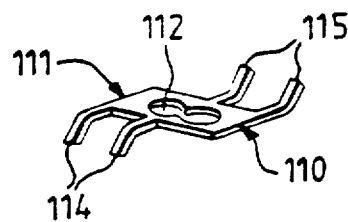
FIG.12
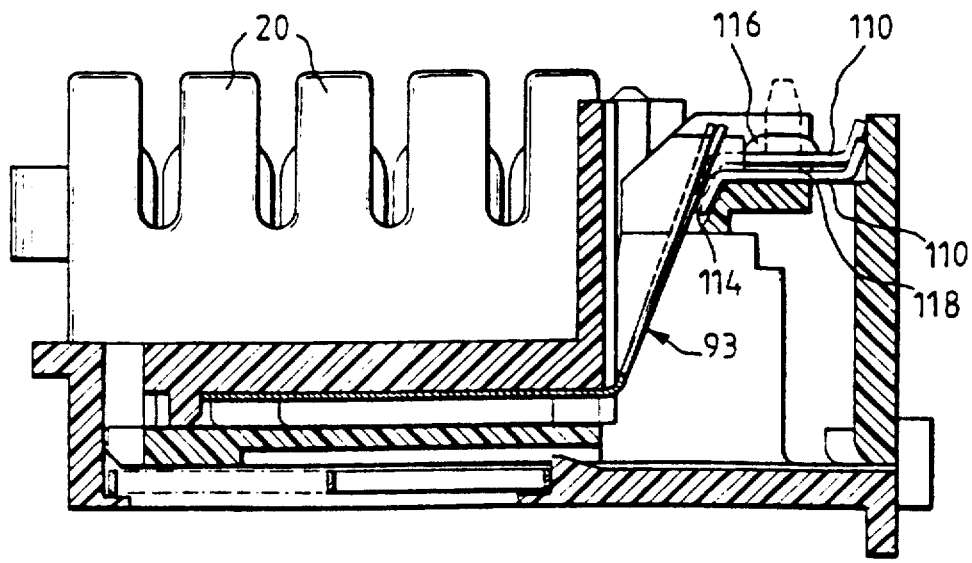

100
ELECTRICAL CONNECTORS

FIELD OF THE INVENTION

This invention relates to a connection device for providing a connection between an electrical cable terminated by a plug and electrically insulated wires. It has application, for example, in telecommunications where a telephone instrument is connected by a lead with an appropriate plug to a jack provided in the wall panel. The jack requires connection to telephone wires on the opposite side of the wall panel.

BACKGROUND OF THE INVENTION

Arrangements are known in which a jack is provided on a wall panel the jack being connected by way of a printed circuit board to terminal elements which can be connected to the telephone wires Such arrangements are not easily assembled nor are they easily changed when faulty. The present invention is concerned with improved connection apparatus.

SUMMARY AND OBJECTS OF THE INVENTION

According to one aspect of the present invention there is provided a connector for connecting a plug to electrically insulated wires the connector comprising a moulded housing having a cavity or chamber for receiving the plug, a firs set of connecting elements each arranged to receive an insulated wire and to make electrical contact with the core thereof, and a second set of connecting elements each of which are connected to the elements of the first set and which extend from the first set to the cavity to define contacts for electrical connection to contacts carried by the plug.

According to another aspect of the present invention there is provided a face plate or adaptor element for use with a connector of the type discussed above, the face plate or adaptor element being formed on its interior surface with a plurality of projecting elements which are so arranged and positioned that they can engage the housing of the connector such that the connector can be mounted to the face plate or adaptor element by a clip type connection.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a plan view of the first housing part of the connector;

FIG. 6 is a section taken along lines 6—6 of FIG. 3;

FIG. 11 is a plan view of a completed connector;

FIG. 12 is a sectional view taken along line 12—12 of FIG. 11;

DETAILED DESCRIPTION OF THE PREFERRED EMBODIMENTS

Figure 1:
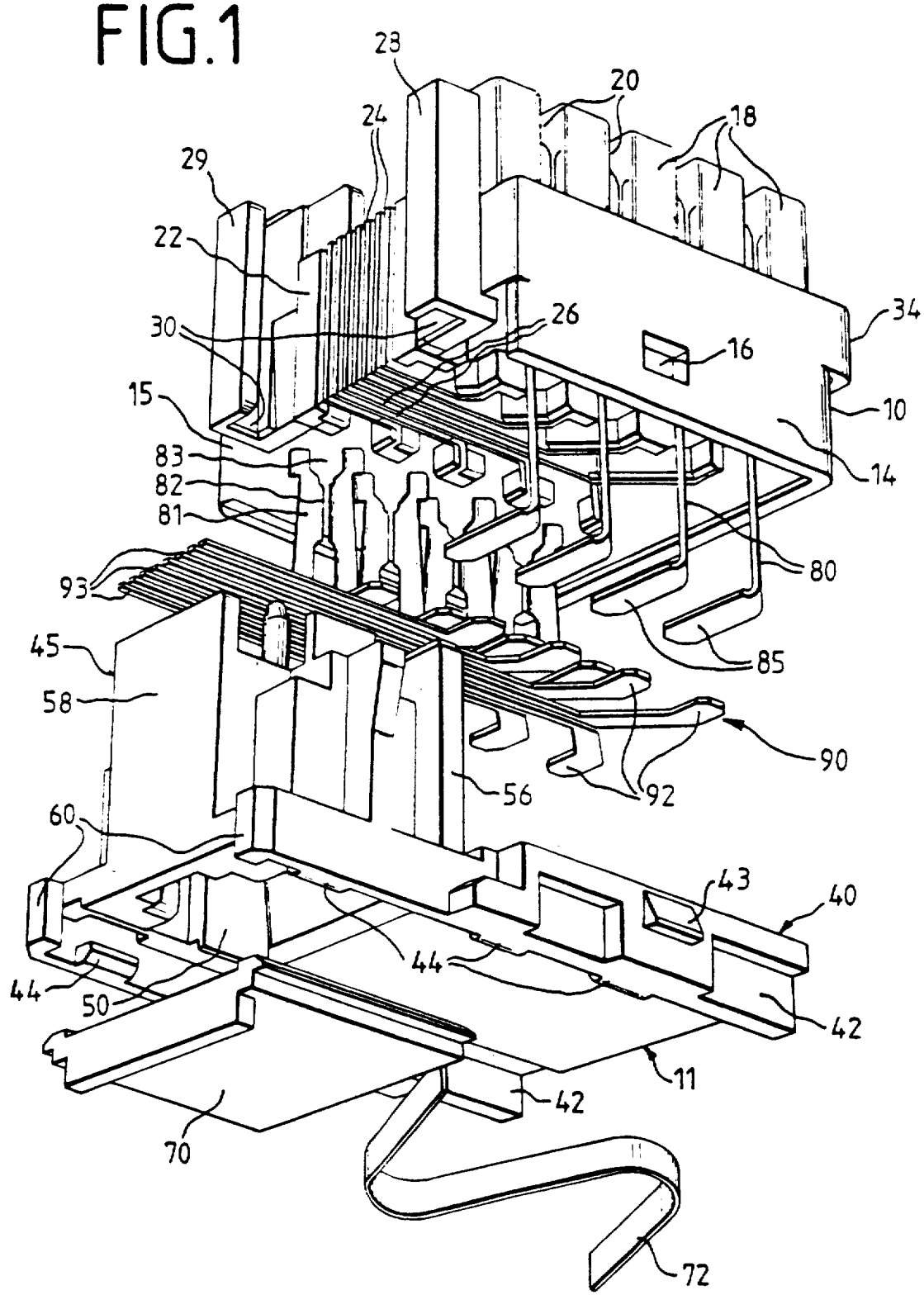
FIG. 1 is an exploded view of a connector in accordance with one embodiment of the present invention.

Referring to the drawings and in particular to FIG. 1, the invention comprises a connector housing formed of a moulded upper body part 10 and a moulded lower body part 11. The upper body part 10 has opposite generally rectangular side walls 14, and 15 each with a through aperture 16. Projecting upwardly from a position adjacent each side wall are two lines of pillar like structures 18. The pillar like structures 18 define clamping means between which are formed slots 20 which can, as will be described later, receive electrically conductive connecting elements 80. An end wall 22 of the upper body part 10 is formed with a series of parallel grooves 24. The grooves 24 communicate with similar grooves 26 which are formed in the lower wall of the upper body part 10. Each of the grooves 26 extends to a position adjacent the lower part of a slot 20 defined by the pillar like structures 18. The end wall 22 also has oppositely facing in moulded parts 28, 29 each of which defines a channel 30. At its opposite end the upper body part 10 is formed with integral hook elements 34, 35 which form clamping means for electrically conductive cables.

Figure 8:
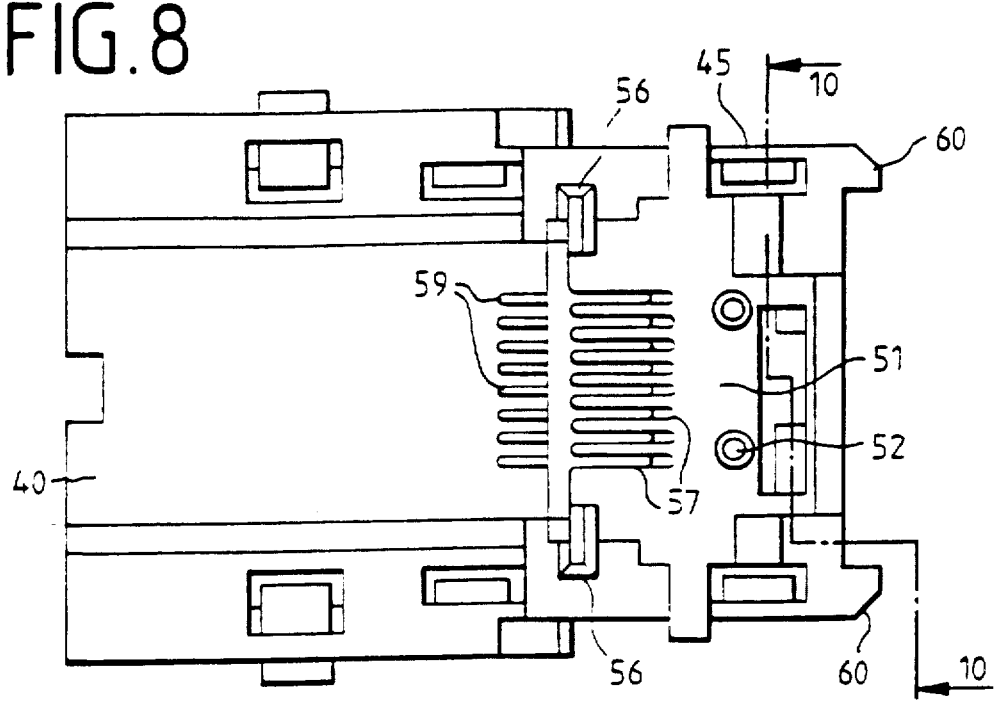
FIG. 8 is a plan view of the second housing part.
Figure 10:
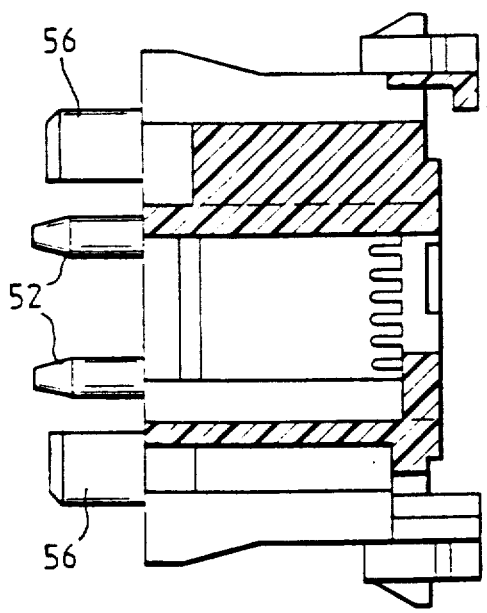
FIG. 10 is a sectional view taken along line 10—10 of FIG. 8.
Figure 9:
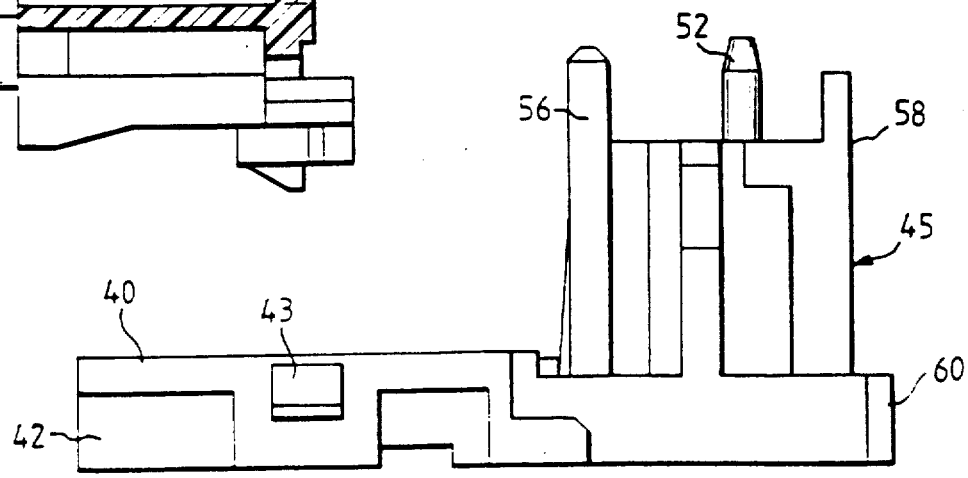
FIG. 9 is a side elevation view of the second housing part.

The lower body part 11 has a generally shallow first end portion 40 which has opposite side walls 42 the outer surface of which is formed with wedge shaped projections 43. On the inner surface of each side wall 42 there are formed inwardly directed flange portions 44. The opposite end portion 45 of the lower body part 11 has a moulded part which defines a cavity 50 for receiving a plug such as that formed on the end of a cable extending from a telephone instrument or a terminal of the type used in computing equipment. The cavity 50 is closed by an end wall 51 from which project a pair of pins 52 Adjacent the first end portion 40 there are formed oppositely disposed upstanding columns 56. The end wall 51 of the lower body part 11 intermediate the columns 56 is formed with parallel slots 57. Small upright projections 59 are formed on the surface of first end portion 40 (see FIG. 8). The spacing and lateral dimensions of the slots 57 and projections 59 are similar to those of the grooves 24. The lower body portion 11 has a planar wall 58 which projects upwardly a distance approximately corresponding to that of the columns 56. The other end of the wall 58 terminates against a projecting part 60 of each of the side walls 42. The lower body part 11 can receive a shutter 70 which is located between the opposite side walls 42 and is retained in position by the flanges 44. The shutter 70 can slide between positions in which it closes the entrance to the cavity 50 and a position in which that cavity 50 is open. A spring 72 is mounted against the shutter 70 to bias it towards the closed position.

A set of eight electrical connecting elements 80 extend into the slots 20 defined by the pillar like structures 18 on the upper body part 10. Each of these elements 80 has a cutting-clamping contact element 81 which is bifurcated and defines a relatively narrow contact slot 82 which opens into a wide mouth portion 83. The arrangement is such that when an electrically insulated wire is placed in the mouth portion 83 and forced downwardly into the narrow contact slot 82 the insulation on the wire is automatically cut so that contact is made between the central conductive core of the wire and the material of the connecting element 80. It will be seen that cutting-clamping contact elements 81 are generally planar and are disposed at substantially 45° to a line through the pillar like structures 18 i.e. 45° to the planar of each slot 20. This type of arrangement is described for example in U.K. Patent Specification No. 2013423. Each connecting element 80 also has a foot portion 85 which is formed integrally with the cutting-clamping contact elements 81.

A second set of connecting elements 90 are shown in the exploded view of FIG. 1. This set includes a series of eight contact tongues 92 each of which, in use is welded to a foot portion 85. An elongate contact strip 93 extends from each contact tongue 92. During assembly of the connector the ends of the conductive strips 93 are initially located in the grooves 26 and are bent slightly around the corner between the lower wall of the upper body part 10 and the end wall 22. As the two body parts 10 and 11 are brought together, the free ends of the conductive strips 93 are guided into and located in the slots 57 of the end wall 51 of the lower body part 11. The free ends of the conductive contact strips 93 are urged into the grooves 24 of the upper body part 10 in the event that a plug is inserted into the cavity 50. The free ends of the elongate conductive contact strips 93 are thus located in the cavity 50 in the completed structure and contact is established by way of these elongate conductive contact strips 93 with the connecting elements 80 which extent upwardly into the pillar like structures 18 of the upper body part 10. In the completed structure the lower body part 11 is retained in contact with the upper body part 10 by means of a snap-fit connection between the wedge shaped projections 43 and the apertures 16 of the upper body part 10.

Figure 2:
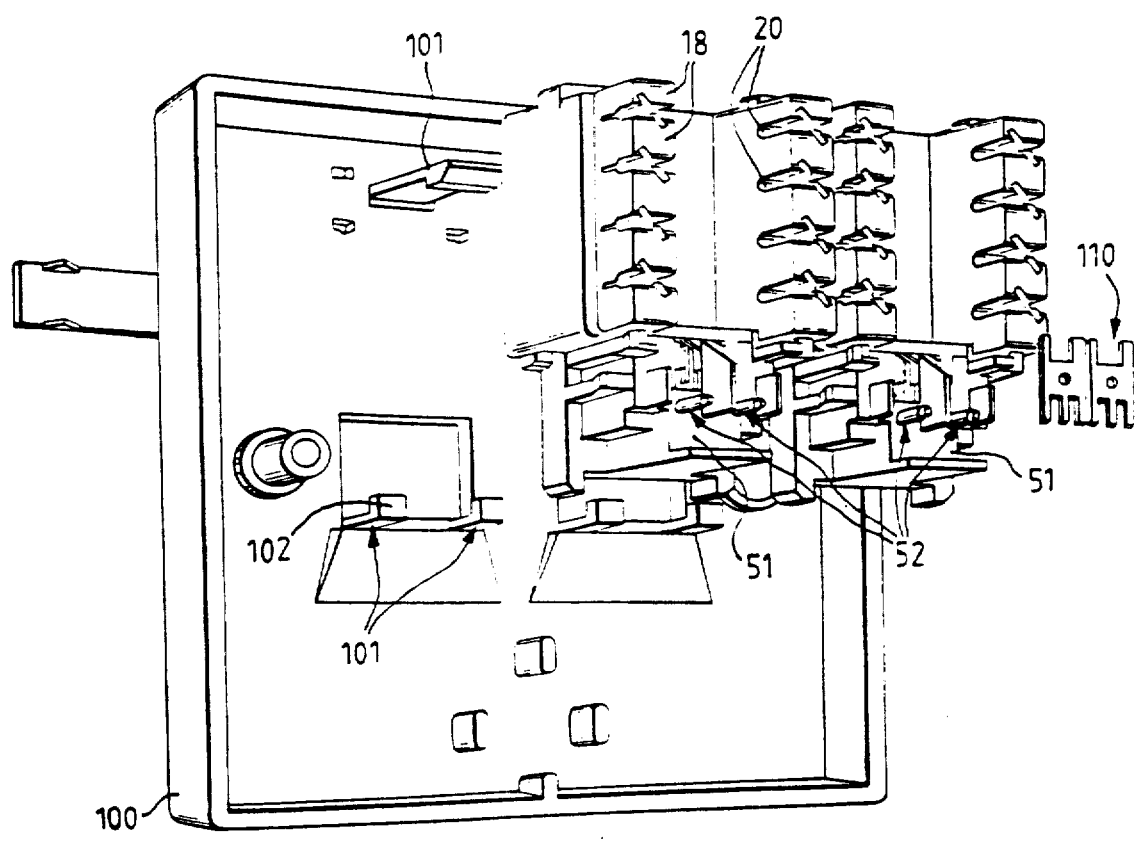
FIG. 2 is a perspective view illustrating how the connector of the present invention can be secured to a face plate.
Figure 4:
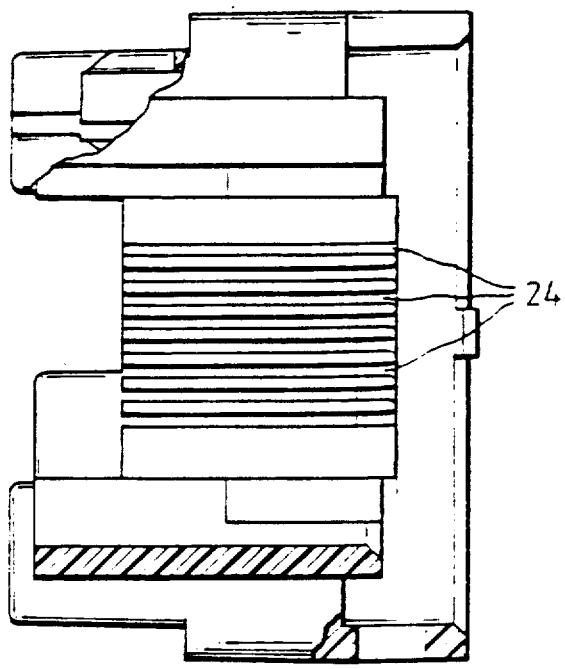
FIG. 4 is an end view of the housing part.
Figure 5:
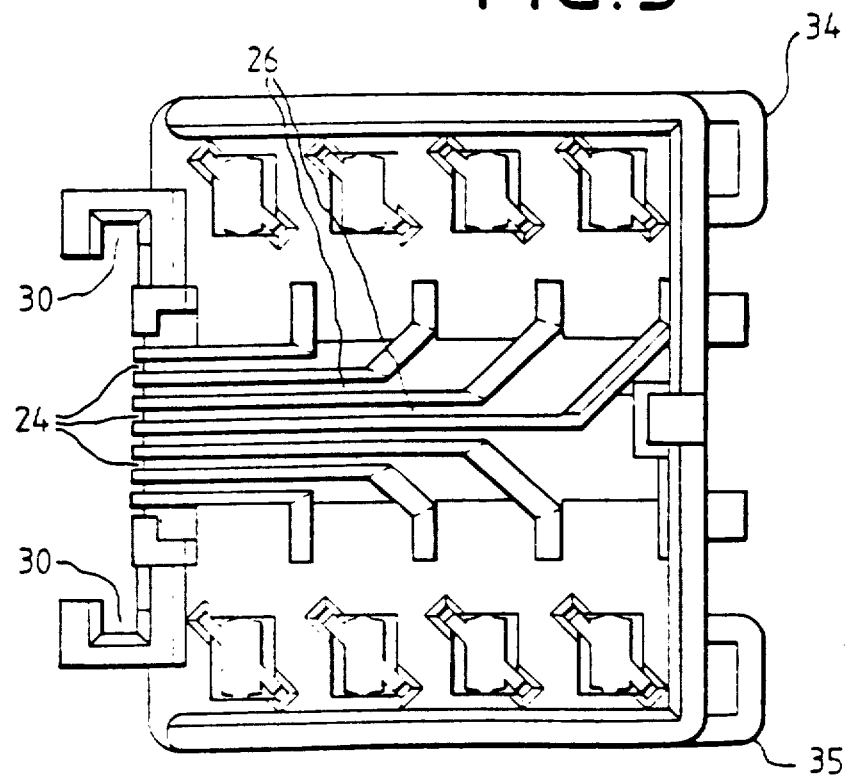
FIG. 5 is a bottom plan view of the housing part.

As can be seen in FIG. 2 the completed structure can be mounted on the interior of a wall mountable face plate 100 of conventional size. The interior surface of the face plate is formed with integrally moulded projecting elements 101. Each element 101 is formed with a lip 102 which can engage an exterior portion of the body parts 10, 11. The structure of the present apparatus enables it to be simply clipped into position using the projecting elements 101 formed of the interior surface of the face plate 100. Connection of telephone wiring or the like can be achieved easily by pushing the conductive wires into the contact slots 82 of the contact elements 81.

Figure 16:
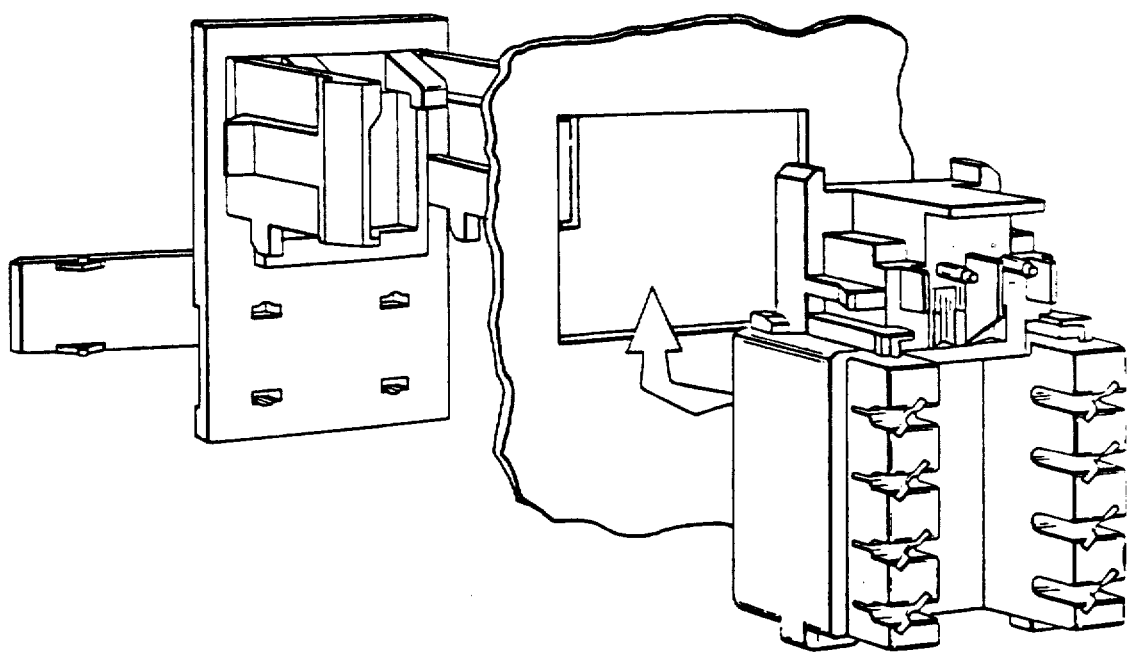
FIG. 16 shows the mounting of a connector when used with a trunking or patch panel.

A feature of the present arrangement is that it provides an integral assembly for receiving a plug connected to a telephone instrument or the like and which also provides a connection facility to telecommunications wiring. It can be mounted on a face plate such as that shown in FIG. 2 and is also suitable for fitting into trunking or patch panels by use of suitable adapters. The connection to the adaptor can be similar to that described for the face place of FIG. 2, an example being shown in FIG. 16. Appropriately shaped elements 110 such as those shown in FIGS. 11 and 12 can be mounted on the pins 52 to short-out predetermined ones of the elongated conductive contact strips 93 of the connecting elements 80, 90 when the plug is not received in the socket 50.

As shown in FIGS. 11 and 12 each element 110 has a body 111 with an aperture 112 and two sets of projecting fingers 114, 115. The apertures 112 are so shaped as to allow the body 111 to be located over the pins 52 in one of two positions and secured in position by a heat-staked spigot 116. As shown in FIGS. 11 and 12 two elements 110 are located on each pin 52 with an insulating strip 118 between. When no plug is located in the cavity 50 the fingers 114 of the element 110 contact and provide a short circuit between selected ones of the contacts 93. This can be for testing purposes, when a plug is inserted into the cavity 50. The short circuits are removed since the contacts 93 are moved away from the fingers 114.

Figure 13:
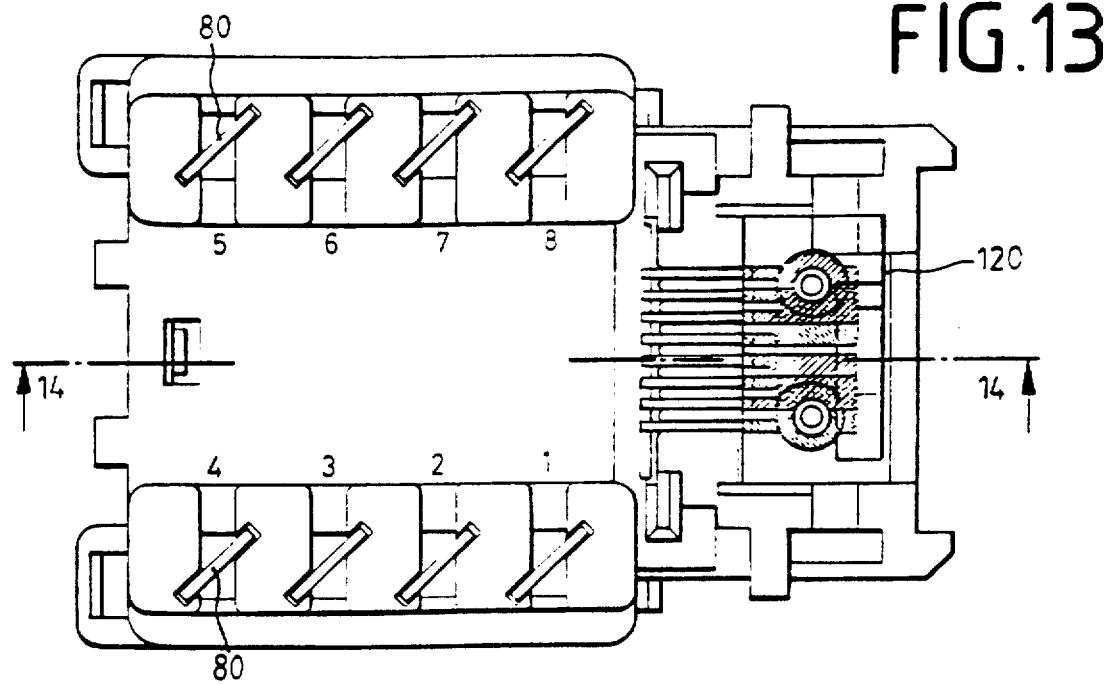
FIG. 13 is a plan view of a modified form of completed connector.
Figure 15:
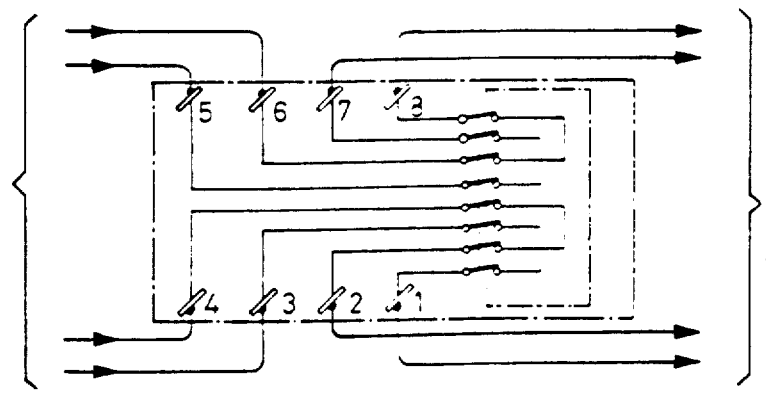
FIG. 15 is a schematic diagram showing electrical connections which can be provided by the arrangement of FIGS. 13 and 14.
Figure 14:
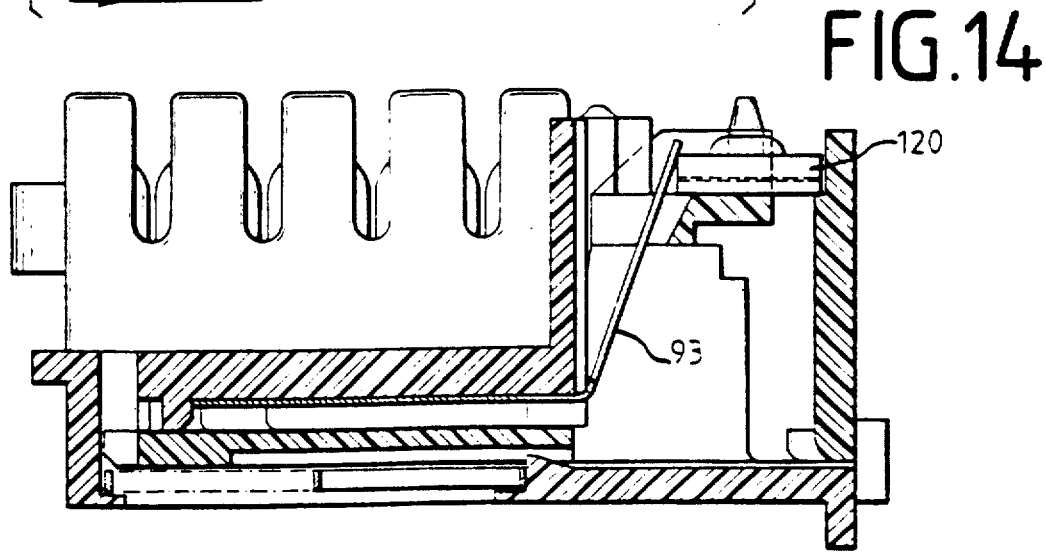
FIG. 14 is a sectional view taken along line 14—14 of FIG. 13.

FIGS. 13 and 14 show an alternative arrangement in which a printed circuit board 120 is mounted on the pins 52. The printed circuit board can provide a short circuit between selected contracts or it can be used to connect preselected resistances between the connecting elements 80, 90. One particular connection configuration is shown in FIG. 15.

Another feature of the device is that it can be mounted the opposite way to that which is conventionally employed. This means that the conductive strips 93 within the cavity 50 will be uppermost and this assists in preventing dust or similar objects from gathering on the strips 93 and possibly shorting-out one or more connecting elements 80, 90. It also assists in preventing the shutter spring 72 from overcoming the retaining clip on the plug when it is in position.

Figure 7:
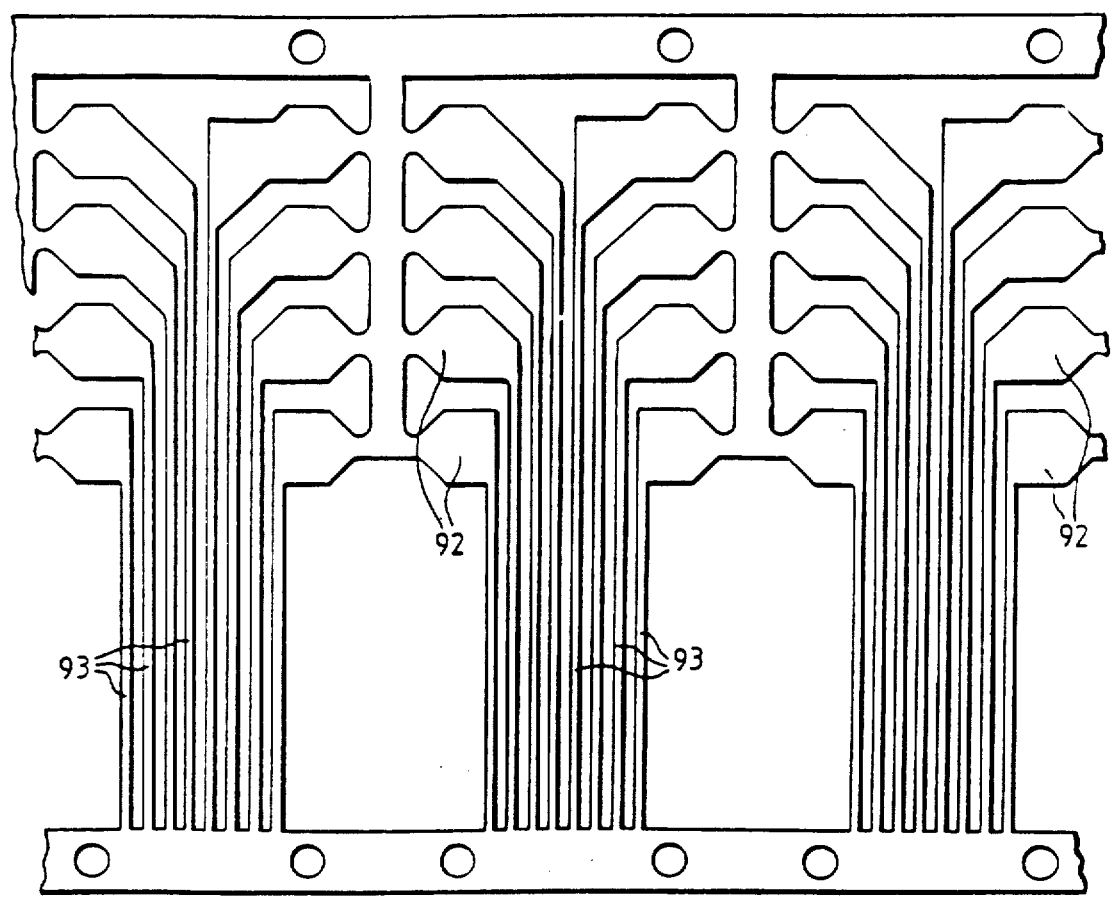
FIG. 7 is a plan view of a contact set used in the apparatus of FIG. 1.

The set of connecting elements 90 can be manufactured by a conventional stamping technique to form a series of sets as shown in FIG. 7 of the drawings. To assemble the device as shown in, for example, FIG. 1 the upper and lower body parts 10, 1 are located substantially as shown in that figure. The contact elements 81 are located in the appropriate position so that they extend up into the upper body part 10. The set of connecting elements 90 is then located so that its contact tongues 92 are against the foot portion 85 of the contact elements 81. These elements 81 are then welded together. The lower body part 11 is then brought upwardly towards the upper body part 10. The columns 56 move into the channels 30 on the upper body part 10 and during this movement the end portion 45 of the lower body part 11 causes the elongate conductive contact strips 93 to be bent around the junction of the lower face and end face of the upper body part 10 so that they are urged into the slots 57. It will thus be seen that this is a particularly simple technique for assembling a connector of the present type.

Figure 17:
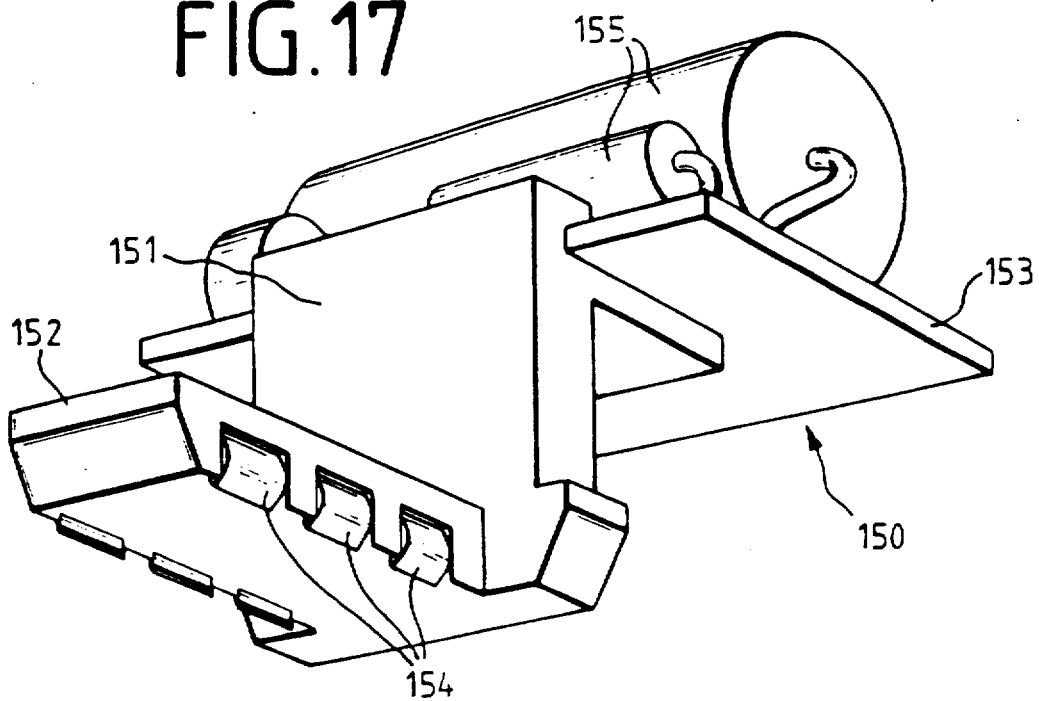
FIG. 17 is a perspective view from below of an insert element for use with the present connector.

An enhancement of the arrangement described above is illustrated in FIGS. 17 to 19. This enhancement takes the form of an insert element 150 which can be connected by a plug-in connection with the connection device described with reference to FIGS. 1 to 16.

Figure 18:
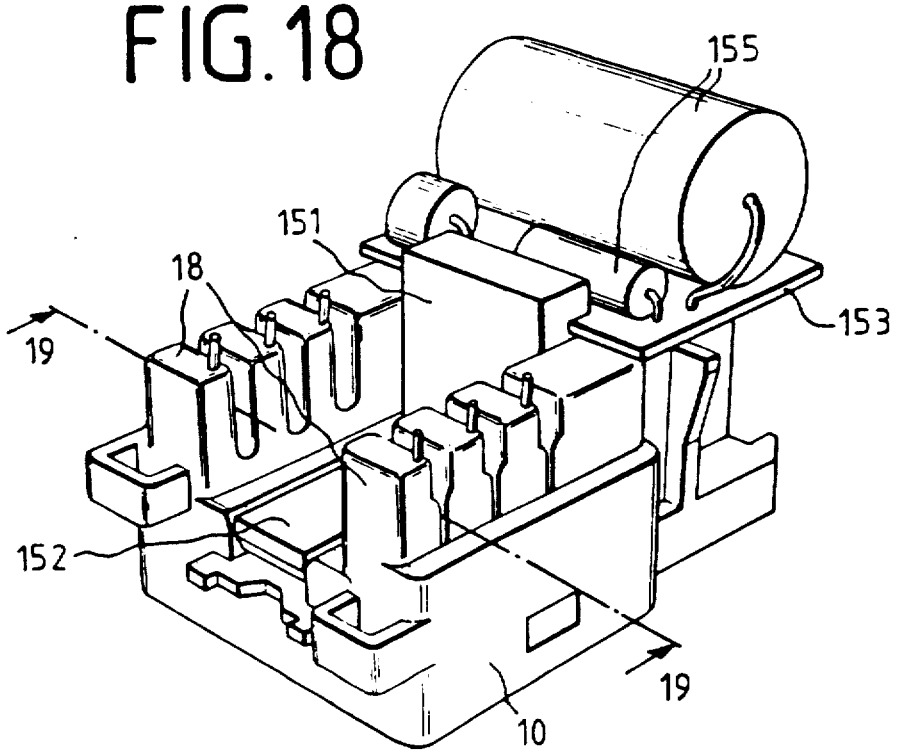
FIG. 18 is a perspective view showing the insert element of FIG. 17 mounted on the connector.
Figure 19:
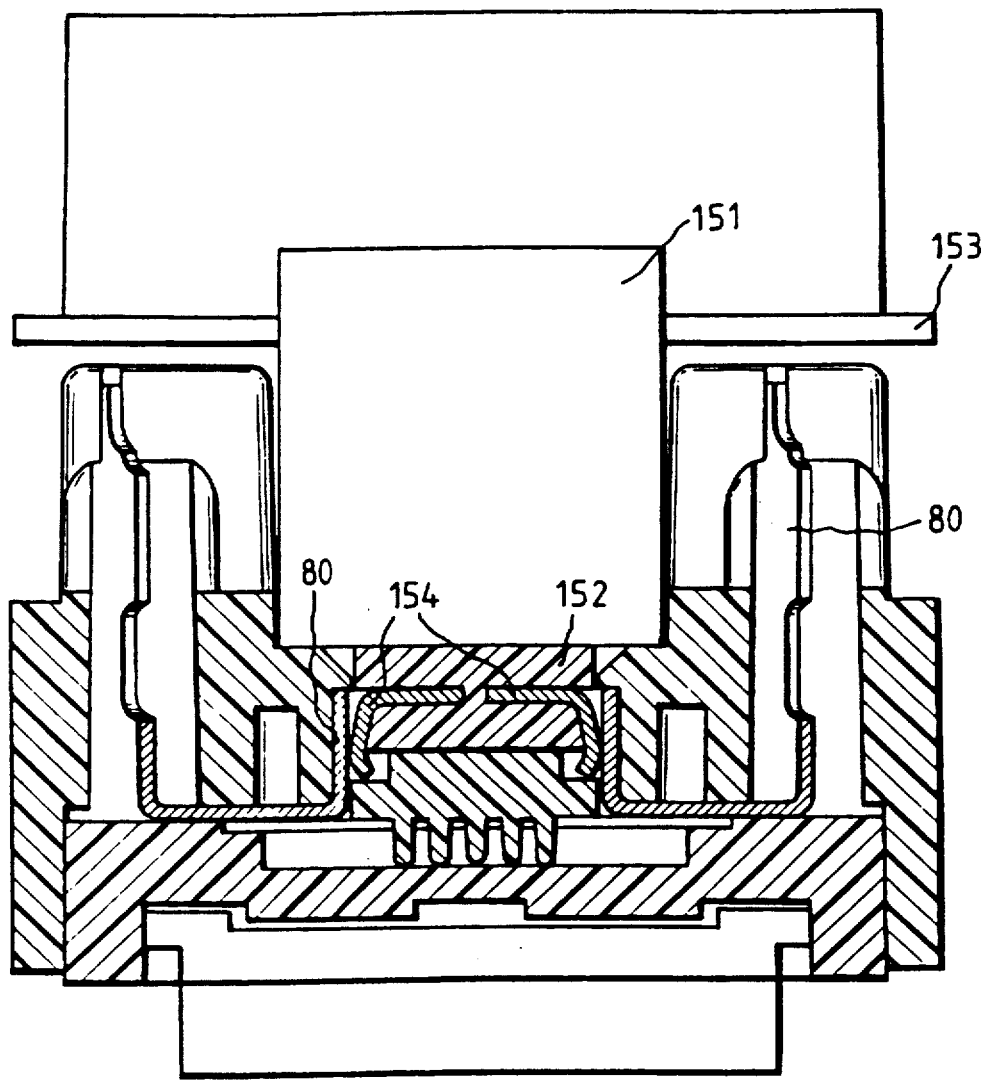
FIG. 19 is a sectional view taken along line 19—19 of FIG. 18.

The insert assembly allows electrical devices such as capacitors, diodes, resistors, etc. to be connected with the connecting elements of the connector. The insert element comprises a moulded body having an upstanding wall 151 from the lower part of which projects a limb 152 and from the upper part of which projects a platform 153. The limb 152 has on its side walls electrically conductive contacts 154. These contacts 154 are connected to conductors (not shown) which extend through the moulded body to the platform 153. The platform 153 can support electrical devices 155 such as capacitors, diodes, resistors, etc. which are mounted on the platform and connected to the conductors just referred to. As shown in FIGS. 18 and 19 the insert assembly is arranged to plug into the housing of the connector device so that the limb 152 locates between the spaced rows of pillar-like structures 18 and the platform locates over the housing part which has the pins 52. It will be appreciated that, to accommodate the insert, the upper body part 10 is formed with cut-away parts which enable the electrically conductive contacts 154 to make an electrical connection with the contact elements 80 which extend into the upper body part 14. In this way the devices mounted on the platform 153 are electrically connected to the contacts of the connection device. The connection between the contacts 154 and the connecting elements of the connector can be seen in FIG. 19.

It will be appreciated that a range of plug-in insert elements can be provided to cater for different requirements which need to be met. The insert can either be fitted at the time of assembling the connection device, or could be fitted on site into an existing connection device.

While specific embodiments of the invention have been shown and described in detail to illustrate the application of the principles of the invention, it will be understood that the invention may be embodied otherwise without departing from such principles.

What is claimed is:

1. A connector for connecting a plug to electrically insulated wires, the connector comprising:
    a molded housing defining a cavity for receiving the plug;
    a first set of connecting elements, each connecting element being arranged to receive an insulated wire and to make electrical contact with a core of the insulated wire;
    a second set of connecting elements, each of the second set of connecting elements being connected to a corresponding one of the first set of connecting elements and extending from the first set of connecting elements to the cavity, the second set of connecting elements being arranged in the cavity to define contacts for electrical connection to contacts carried by the plug.

2. The connector according to claim 1, wherein the first set of connecting elements are welded to the second set of connecting elements.

3. A connector according to claim 1, wherein the cavity includes an opening for receiving the plug, and a shutter for closing the opening in the absence of a plug.

4. A connector according to claim 1, wherein the housing includes clamping means for clamping a cable of which the insulated wires form a part.

5. A connector according to claim 1, wherein the housing includes means for connection of the housing to a wall mountable face plate.

6. A connector according to claim 1, wherein said second set of connecting elements each have a first portion extending from the first set of connecting elements and a second portion extending into the cavity, the second portion extending substantially at right angles to the first portion.

7. A connector according to claim 6, wherein the housing comprises a first part and a second part which are secured together, the second portion of the second set of connecting elements being bent to extend into the cavity upon the connection of the first housing part and the second housing part.

8. A connector according to claim 7, further comprising means providing a connection between selected ones of the second portion of the second set of connecting elements for one of short circuiting the second set of connecting elements or providing a connection having a selected impedance between the selected ones of the second set of connecting elements.

9. A connector according to claim 7, wherein the first and second housing parts are secured together by a snap fit connection.

10. A connector according to claim 7, wherein the first housing part includes elongate channels for receiving the contact elements.

11. A connector according to claim 1, wherein the first set of connecting elements are formed from generally planar material to define cutting/clamping contact elements having a central contact slot for engaging the connective core of an insulated wire and having an opening which is wider than the contact slot, the contact slot having walls with sharp edges of a width which is less than the core diameter of the insulated wire whereby when a wire is pushed into the contact slot, the insulating material is cut and contact is made between the core and the connecting element.

12. A connector according to claim 11, wherein the housing includes portions defining a slot, the cutting/clamping contact elements being positioned extending from each side of said slot in a plane of substantially 45° with respect to the slot.

13. A connector accordingly to claim 1, further comprising:
    an insert element having electrical contacts, the housing including means for receiving the insert element having electrical contacts for providing an electrical connection between the electrical contacts and the connecting elements.

14. A connector according to claim 13, wherein the insert element is mounted on the housing by means of a plug-in connection.

15. A connector according to claim 13, wherein the insert carries an electrical device including at least one of a capacitor, a diode, a resistor, which can be connected to the connecting elements by means of the electrical contacts.

16. A connector according to claim 1, further comprising a face plate/adaptor element having an interior surface with a plurality of projecting elements, the projecting elements being arranged and positioned for engaging the housing for mounting the face plate/adaptor element by a clip type connection.

17. A connector according to claim 16, wherein the projecting elements are molded integrally with the material of the face plate.

18. A connector for connecting a modular telecommunication plug to electrically insulated wires, formed by the steps of:
- forming a first molded housing part including pillar portions defining a plurality of slots between adjacent pillars and a central portion between a first and second row of pillars, the central portion having a lower surface defining a plurality of grooves and the central portion having a front side surface defining a front surface plurality of grooves aligned with the bottom surface grooves;
- positioning cutting/clamping contact elements in slots defined by the housing to form cutting/clamping connectors between the pillars, the cutting/clamping contacts including a first set of connecting elements extending to a lower portion of the first housing element;
- positioning a second set of connecting elements in the lower surface slots, the connecting elements including contact tongues;
- welding one of the contact tongues to a corresponding lower portion of each of the first set of connecting element to form a first housing part, cutting/clamping contact elements, first set of connecting elements and second set of connecting elements subassembly;
- providing a second housing part defining a cavity for receiving the modular telecommunication plug, the second housing part having a surface portion extending into the cavity;
- connecting the subassembly and the second housing part and bending a portion of the connecting elements with the second housing part surface area such that a portion of the second set of connecting elements extends into the cavity angled with respect to a first portion of the connecting elements.

* * * * *